Patented Mar. 17, 1936

2,034,333

UNITED STATES PATENT OFFICE 2,034,333

IRON BILE SALT AND PROCESS OF MAKING IT

Henry Doubilet, New York, N. Y., assignor to Eli Lilly and Company, Indianapolis, Ind., a corporation of Indiana No Drawing. Application August 2, 1935, Serial No. 34,385

8 Claims. (Cl. 167—68)

My invention relates to iron bile salts as a therapeutic agent, and to the process of obtaining such iron bile salts; and my invention is intended to cover such iron bile salts as a therapeutic agent whether in pure or impure form and whether individually or collectively and whether or not mixed with other materials.

I have prepared iron bile salts in solid form, and found that they are most effective as a therapeutic agent, mainly in the treatment of diseases of the liver and the gall bladder. As such a therapeutic agent, they have a number of marked advantages, including the following:

1. They are substantially insoluble under acid conditions; so that they are insoluble in the stomach, and in consequence do not irritate the stomach.

2. They are soluble under alkaline conditions, and hence are soluble in the intestinal tract.

3. In consequence of items 1 and 2 they need no enteric coating, and therefore need no special treatment or protection to ensure their passage through the stomach substantially without change and their absorption from the intestinal tract; and in consequence avoid the uncertainties incident to so-called "enteric coatings".

4. They have a quadruple therapeutic advantage, in that:

a. The bile-salt portion supplies certain constitutional deficiencies, such as occur from the lack of a normal amount of bile acids;

b. The iron portion supplies certain other constitutional deficiencies, such as occur in various types of anemia;

c. The bile-salt portion by its close association with the iron portion facilitates the absorption of the iron from the intestinal tract, and by this synergistic action promotes the efficacy of the administered iron; and d. The presence of the iron makes it possible to administer a larger amount of the bile salts without causing diarrhea, as the diarrhea-causing tendency of bile salts is partly counteracted by the constipating effect of the iron.

These things all tend to make a highly effective therapeutic product.

5. They are easily handled.

These iron bile salts can be obtained from the bile of any animal, and indeed from any of various bile-acid and bile-salt preparations, by treatment with an ionizable iron salt. The bile I prefer is beef bile, obtained at the slaughter of the beef by draining the gall bladder; since beef bile is very much like human bile in its content of the various types of bile-acids and their salts.

There are in bile a number of bile acids and/or their salts, and so by the term "iron bile salts" I intend to include the iron salts of any or all of these bile acids, individually and/or collectively in various groupings. The main bile acids of human bile and of beef bile are cholic acid and deoxycholic acid, and their amino-acid compounds taurocholic acid, glycocholic acid, taurodeoxycholic acid, and glycodeoxycholic acid. These are all known bile acids, although not all of them have been isolated in pure form.

If desired, I can prepare impure iron bile salts by merely treating bile itself with an ionizable iron salt, such as ferric chloride or ferric nitrate or ferrous chloride or ferrous sulphate, at a hydrogen ion concentration and a bile concentration at which formation of the insoluble iron bile salts occurs to produce a precipitate. This precipitate contains much other material besides the desired iron bile salts, and some of the other material is therapeutically undesirable in many conditions; but nevertheless, and in spite of the presence of such other material, the precipitate thus obtained can be administered orally with beneficial results in the majority of cases requiring an additional amount of bile salts and/or of iron.

In this precipitation, the hydrogen ion concentration of the bile is desirably adjusted fairly close to neutrality; if the solution is adjusted to too high an acidity a certain amount of the bile acids will be precipitated as such, and if it is adjusted to too high an alkalinity varying amounts of the iron will be precipitated as an inorganic iron compound. Although impure iron bile salts may be obtained over a wide range of hydrogen ion concentration, from about pH 5 to about pH 8, the maximum purity is obtained at a very slight acidity, between pH 6.9 and pH 7.0; and so, to maintain that pH, a suitable buffer may be added, such as a borax and boric-acid buffer.

The bile concentration at which the precipitation is carried out may vary over a wide range, but desirably the bile concentration at the time of precipitation is of the order of about one-third that of the original bile.

Originally purer iron bile salts are desired than can be obtained by the mere precipitation of such salts directly from bile itself. That is, it is generally desirable that the final iron bile salts which are to be used therapeutically shall be largely if not wholly free from fats and from cholesterol, especially when diseases involving the gall bladder are to be treated, because of the adverse effects of fats and of cholesterol on the affected gall bladder; and also from proteins, which increase the bulk necessary to be handled and administered.

Therefore, instead of precipitating the iron bile salts directly from bile, I prefer to make such precipitation from some bile-acid or bile-salt preparation which is free to a greater or less extent, and desirably substantially entirely, from such naturally occurring things as fats, cholesterol, proteins, and pigments, as well as from any added substances which might tend to inhibit the precipitation.

To this end, I desirably first obtain a purified bile-acid or bile-salt preparation by some one of the known methods. The one which I prefer for this involves the precipitation of the impurities from the bile by zinc hydroxide, and is conveniently carried out as follows:

I treat the bile with a solution of sodium hydroxide, conveniently in about two per cent concentration and in a volume about equal to the volume of the bile. Then I add a molecular equivalent (equivalent to the sodium hydroxide) of zinc sulphate, conveniently in about ten per cent solution. The sodium hydroxide and zinc sulphate react to produce a zinc hydroxide; which in turn precipitates proteins, fats, cholesterol, and pigments, while leaving the bile salts in solution or adsorbed on the precipitate. This precipitate is separated from the supernatant liquid, conveniently by filtration. The precipitate is thoroughly washed, first with water, and then with alcohol, conveniently about 95% ethyl alcohol, to remove therefrom any adsorbed bile acids and/or bile salts. The water washings are added to the original filtrate; but the alcohol washings are kept separate, the alcohol removed therefrom by evaporation, and the residue taken up in a small amount of water and added to the water filtrate.

This combined water filtrate is a convenient purified preparation of bile salts or bile acids (depending on the hydrogen ion concentration) from which to obtain purified iron bile salts.

To obtain such purified iron bile salts, I adjust such combined water filtrate to a suitable hydrogen ion concentration, desirably about pH 6.95. To get this adjustment may require the addition of acid in some cases and of alkali in other cases, because of the variable hydrogen ion concentration of bile; and any suitable acidifying or alkalinizing agent may be used, conveniently hydrochloric acid or sodium hydroxide. If desired, the buffer above referred to, of borax and boric acid may also be added.

After the desired hydrogen ion concentration has been obtained, a solution of an ionizable iron salt is added, desirably in excess. I prefer a ferric salt, such as ferric chloride or ferric nitrate; but a ferrous salt, such as ferrous chloride or ferrous sulphate, may be used.

A precipitate is thus obtained of the iron bile salts; and is separated from the supernatant liquid, as by filtration, and dried.

The iron bile salts thus obtained, conveniently after being powdered, may be orally administered in any desired manner, as in capsules or tablets, alone or mixed with other materials of any desired character. Effective dosages for chronic gall-bladder diseases are usually in the neighborhood of twenty to sixty grains per day; and doses of that size can be administered without any ill effects. The optimum dosage is determined for each case by observing the number of bowel movements per day; two such movements are usually found desirable, and if the number of such movements is greater or less than two the dosage is decreased or increased accordingly.

My iron bile salts can be administered in larger dosages, as measured in the amount of bile salts present, than is possible with any previous bile salts preparation of which I am aware. Moreover, this dosage is in sharp contradistinction to the commonly accepted dosage of bile salts, which is usually of the order of one to ten grains per day.

I claim as my invention:

1. The process of preparing iron bile salts, which consists in treating a substance of the class consisting of bile and bile-acid and bile-salt preparations with an ionizable iron salt, at a hydrogen ion concentration at which formation of insoluble iron bile salts occurs.

2. The process of preparing iron bile salts, which consists in treating a substance of the class consisting of bile and bile-acid and bile-salt preparations with an ionizable iron salt, at a hydrogen ion concentration at which formation of insoluble iron bile salts occurs; and separating from the liquid the precipitated iron bile salts, and drying them.

3. The process of preparing iron bile salts, which consists in treating a substance of the class consisting of bile and bile-acid and bile-salt preparations with an ionizable iron salt, at a hydrogen ion concentration between pH 6.9 and pH 7.0.

4. The process of preparing iron bile salts which consists in treating a substance of the class consisting of bile and bile-acid and bile-salt preparations with an ionizable iron salt, at a hydrogen ion concentration between pH 6.9 and pH 7.0; and separating from the liquid the precipitated iron bile salts, and drying them.

5. Iron bile salts, in substantially dry form.

6. Ferric bile salts, in substantially dry form.

7. Ferrous bile salts, in substantially dry form.

8. A therapeutic agent, comprising iron bile salts.

HENRY DOUBILET.